(12) United States Patent
Zhao et al.

(10) Patent No.: US 8,415,440 B2
(45) Date of Patent: Apr. 9, 2013

(54) PLASTICIZATION MODIFYING AGENT FOR POLYVINYL CHLORIDE PROCESSING AND PREPARATION METHOD AND USE THEREOF

(75) Inventors: Dongri Zhao, Weifang (CN); Xiaojun Zheng, Weifang (CN)

(73) Assignee: Shandong Rike Chemical Co., Ltd., Weifang, Shandong (CN)

( * ) Notice: Subject to any disclaimer, the term of this patent is extended or adjusted under 35 U.S.C. 154(b) by 0 days.

(21) Appl. No.: 11/992,864

(22) PCT Filed: Apr. 28, 2006

(86) PCT No.: PCT/CN2006/000842
§ 371 (c)(1),
(2), (4) Date: Mar. 28, 2008

(87) PCT Pub. No.: WO2007/036096
PCT Pub. Date: Apr. 5, 2007

(65) Prior Publication Data
US 2009/0264597 A1    Oct. 22, 2009

(30) Foreign Application Priority Data

Sep. 30, 2005 (CN) .......................... 2005 1 0105276

(51) Int. Cl.
*C08F 20/10* (2006.01)
*C08F 120/10* (2006.01)
*C08F 220/10* (2006.01)
*C08F 120/18* (2006.01)
*C08L 33/04* (2006.01)
*C08L 33/06* (2006.01)
*C08L 27/06* (2006.01)

(52) U.S. Cl.
USPC ..... 526/328; 526/319; 526/328.5; 526/329.7; 525/227; 525/222; 525/239

(58) Field of Classification Search ............. 525/239, 525/222, 227; 526/329.7, 328, 319, 328.5
See application file for complete search history.

(56) References Cited

U.S. PATENT DOCUMENTS

| | | | | |
|---|---|---|---|---|
| 3,673,283 A * | 6/1972 | Tanaka et al. | ................. | 525/230 |
| 4,357,435 A | 11/1982 | Lewis et al. | ................. | 524/239 |
| 4,511,699 A | 4/1985 | Melby et al. | ................. | 525/205 |
| 4,547,550 A * | 10/1985 | Melby et al. | ................. | 525/205 |
| 4,983,760 A | 1/1991 | Bobar et al. | ................. | 560/190 |
| 6,221,966 B1 * | 4/2001 | Nakanishi et al. | ............. | 525/228 |
| 2001/0056150 A1 * | 12/2001 | Smith et al. | ................. | 524/458 |

FOREIGN PATENT DOCUMENTS

| CN | 1046918 | 11/1990 |
|---|---|---|
| CN | 1426440 | 6/2003 |

OTHER PUBLICATIONS

International Search Report dated Aug. 10, 2006 corresponding to PCT international application No. PCT/CN2006/000842.

* cited by examiner

*Primary Examiner* — Irina Krylova
(74) *Attorney, Agent, or Firm* — Ohlandt, Greeley, Ruggiero & Perle, L.L.P.

(57) ABSTRACT

The invention relates to a plasticization modifying agent for polyvinyl chloride processing and preparation method and use thereof, and it belongs to the field of modifying agent for polyvinyl chloride processing. Said modifying agent is a polymer obtained from monomer composition consisting of 60 to 100 parts by weight of alkyl methacrylate and 0 to 40 parts by weight of alkyl acrylate with total weight of 100 parts, the intrinsic viscosity of the polymer is higher than 7.5. The invention also provides the preparation method of said high viscosity coefficient modifying agent. The invention breaks through the localization and misapprehension in the art, said plasticization modifying agent can effectively improve finish degree of polyvinyl chloride rheological block, enhance plasticization property of polyvinyl chloride. The polymer can be widely used for modification of polyvinyl chloride or composite material containing polyvinyl chloride.

9 Claims, No Drawings

PLASTICIZATION MODIFYING AGENT FOR POLYVINYL CHLORIDE PROCESSING AND PREPARATION METHOD AND USE THEREOF

TECHNOLOGY FIELD

The invention belongs to the field of plasticization modifying agent for polyvinyl chloride (PVC) processing, and particularly relates to a high molecular weight polymer which effectively improves PVC processing properties, especially plasticization properties.

BACKGROUND OF THE INVENTION

PVC is a kind of general-thermoplastic with excellent performance and is one of the plastics with the largest output in China. PVC processing molding performance is poor. Accordingly, PVC must be filled with the processing modifying agent in order to improve its plasticization processing performance. Acrylate processing modifying agent is one of the best three kinds of the modifying agents which are adopted widely in China. But at present, the intrinsic viscosity coefficient of all acrylate processing modifying agents is usually less than 6.0. In general, when manufacturing acrylate plasticization modifying agent for PVC processing, the reaction temperature is usually higher than 65° C., and the raw material is added stepwise or batchwise to avoid intense reaction due to too much feed material or too high reaction temperature which damages the reactor and incurs danger. Now the intrinsic viscosity coefficients of PVC processing aids are all less than 7.0, and the processing performance of PVC modified is not ideal. In the prior art, there is no description about the relation between the intrinsic viscosity and PVC processing modifying agents.

In addition, regarding to the control of polymerization reaction, especially the polymerization reaction of acrylate plasticization modifying agents for PVC processing, almost all those skilled in the art believe that, because the reaction is an exothermal reaction, in order to prevent the excessive polymerization reaction, the reaction monomers must be added gradually or batchwise to the reactor, meanwhile maintain a relatively high reaction temperature in order to ensure the reaction to proceed smoothly. The polymerization reaction is hardly to occur under the lower reaction temperature.

The inventor filed patent application (No.200510079818.8) on Jun. 29, 2005, wherein a kind of plasticization modifying agent for PVC processing was disclosed. This modifying agent is a polymer obtained from the composition consisting of 0-100 parts by weight of alkyl methacrylate, 0-40 parts by weight of alkyl acrylate, 0-85 parts by weight of styrene monomers and 0-35 parts by weight of acrylonitrile monomers with total weight of 100 parts, the intrinsic viscosity of the polymer is higher than 7.5. The invention also provides the preparation method of this plasticization modifying agent for PVC processing. By the further experiments on this basis, the inventor found that the plasticization modifying agent with excellent performance can also be obtained under the conditions of different composition and preparation method from the above-mentioned application.

SUMMARY OF THE INVENTION

It is an object of the present invention to provide a modifying agent with an intrinsic viscosity higher than 7.5 for improving PVC processing property, especially plasticization property, and preparation method and use thereof.

The embodiments of the invention are as follows:

A plasticization modifying agent for PVC processing, characterized in that it is a polymer obtained from the monomer composition consisting of 60 to 100 parts by weight of alkyl methacrylate and 0 to 40 parts by weight of alkyl acrylate with total weight of 100 parts, and the intrinsic viscosity of the polymer is higher than 7.5.

The preparation method of the high molecular weight polymer with an intrinsic viscosity higher than 7.5 is as follows:

100 to 250 parts by weight of water is added into the reactor, and then monomer mixtures consisting of 60 to 100 parts by weight of alkyl methacrylate and 0 to 40 parts by weight of alkyl acrylate with total weight of 100 parts, 0.1 to 1.5 parts by weight of the surfactant and 0.001 to 0.2 parts by weight of the free-radical initiator are put into the same reactor by once, twice or three times respectively. The mixture solution is stirred at 50-500 round/min and heated to 40-60° C. The temperature of the solution is maintained under 65° C. After reacting 10-25 hours, the polymer emulsion is obtained and followed by drying to give the plasticization modifying agent for polyvinyl chloride processing.

A plasticization modifying agent for PVC processing, characterized in that it is a polymer obtained from the monomer composition consisting of 60 to 95 parts by weight of alkyl methacrylate and 5 to 40 parts by weight of alkyl acrylate with total weight of 100 parts, the intrinsic viscosity of the polymer is higher than 7.5.

The preparation method of the high molecular-weight polymer with an intrinsic viscosity high than 7.5 is as follows:

100 to 250 parts by weight of water is added into the reactor, and then monomer mixtures consisting of 60 to 95 parts by weight of alkyl methacrylate and 5 to 40 parts by weight of alkyl acrylate with total weight of 100 parts, 0.1 to 1.5 parts by weight of the surfactant and 0.001 to 0.2 parts by weight of the free-radical initiator are put into the same reactor by once, twice or three times respectively. The mixture solution is stirred at 50-500 round/min and heated to 40-60° C. The temperature of the solution is maintained under 55° C. After reacting 10-25 hours, the polymer emulsion is obtained and followed by drying to give the plasticization modifying agent for polyvinyl chloride processing.

The above-mentioned alkyl methacrylate is a mixture which consists of one, two or more kinds of alkyl methacrylate comprising 1 to 8 carbon atoms. The above-mentioned alkyl acrylate is also a mixture which consists of one, two or more kinds of alkyl acrylate comprising 2 to 8 carbon atoms.

The above-mentioned surfactant is sodium dodecyl benzene sulfonate, sodium dodecyl sulfonate, sodium dodecyl sufate, sodium stearate or potassium dodecyl sulfate. The above-mentioned radical initiator is potassium persulfate or ammonium persulfate.

The above-mentioned intrinsic viscosity coefficient is measured by the ubbelohde viscometer.

The preparation method of plasticization modifying agent for PVC processing is characterized as follows:

100 to 250 parts by weight of water is added into the reactor, and then monomer mixtures consisting of 60 to 100 parts by weight of alkyl methacrylate and 0 to 40 parts by weight of alkyl acrylate with total weight of 100 parts, 0.1 to 1.5 parts by weight of the surfactant and 0.001 to 0.2 parts by weight of the free-radical initiator are put into the same reactor by once, twice or three times respectively. The mixture solution is stirred at 50-500 round/min and heated to 40-60° C. The temperature of the solution is maintained under 65° C. After reacting 10-25 hours, the polymer emulsion is obtained and followed by drying to give the plasticization modifying agent for polyvinyl chloride processing.

Another preparation method of plasticization modifying agent for PVC processing is characterized as follows:

100 to 250 parts by weight of water is added into the reactor, and then monomer mixtures consisting of 60 to 95 parts by weight of alkyl methacrylate and 5 to 40 parts by weight of alkyl acrylate with total weight of 100 parts, 0.1 to 1.5 parts by weight of the surfactant and 0.001 to 0.2 parts by weight of the free-radical initiator are put into the same reactor by once, twice or three times respectively. The mixture solution is stirred at 50-500 round/min and heated to 40-50° C. The temperature of the solution is maintained under 55° C. After reacting 10-25 hours, the polymer emulsion is obtained and followed by drying to give the plasticization modifying agent for polyvinyl chloride processing.

The percentage of the plasticization modifying agent added for PVC processing is 0.1%-10% weight of PVC.

By the experiment, the inventor found that the modification performance of plasticization modifying agent for PVC processing is closely related to its intrinsic viscosity coefficient. The higher intrinsic viscosity coefficient, the better the processing plasticization performance of modified PVC. The effective way of improving the processing performance of PVC mixtures is to prepare and use modifying agent with the higher intrinsic viscosity value. After numerous experiments, the inventor reached the following conclusions: the modification effect of the plasticization modifying agent for PVC processing is improved with the increase of its intrinsic viscosity coefficient. This fact is especially true for acrylate processing plasticization modifying agent, and it is more obviously subjected to the above-regularity. However, by now, the intrinsic viscosity coefficient of the plasticization modifying agent for PVC processing used is less than 7.5 in the prior art. Furthermore, those skilled in the art generally believe that there is no direct link between the modification effect of the processing plasticization modifying agent and its intrinsic viscosity.

By the experiment and research, the inventor also found that the intrinsic viscosity of the plasticization modifying agent for PVC processing is greatly affected by its polymerization reaction conditions, especially feeding mode of polymer monomers, reaction time and temperature. In a certain temperature, the intrinsic viscosity coefficient of the resultant polymer is the highest if all raw material is added into the reactor by once. The more frequent the feeding times, i.e. the smaller amount for each feeding, the lower the viscosity coefficient. Under the same frequency of feeding, the lower the reaction temperature, the higher intrinsic viscosity coefficient. At the same time, the lower the reaction temperature, the longer the reaction time, thereby the higher the viscosity coefficient. By the research, the inventor found that, during making acrylate processing plasticization modifying agent, if the reaction temperature is controlled under 55° C. or 65° C., one-time feeding gives a high molecular-weight polymer with a viscosity coefficient higher than 10.5, two-times feeding gives a viscosity coefficient 9.0-10.0, three-times feeding gives a viscosity coefficient of 7.5-9.0, and four-times feeding gives a viscosity coefficient of less than 7.5. If the monomer or the monomer mixture, the surfactant and the initiator in the above-mentioned composition ratio are added into the reactor by once, twice or three times, modifying agent polymers with an intrinsic viscosity coefficient higher than 7.5 can be obtained provided that the reaction temperature and time are controlled according the above-mentioned requests and conditions. But those skilled in the art generally believe that this polymerization reaction is an exothermic reaction and the reaction temperature must be controlled over 65° C. Owing to reaction speed is accelerated with the increase of reaction temperature, so the feeding frequency for the polymerization reaction must be strictly controlled to prevent over polymerization reaction from the happening due to swift raise of the reaction temperature, thereby ensure the reactor and operator safe. Thus, all kinds of raw material must be added into the reactor by three times or more at over 65° C. On the contrary, if all raw material is added into the reactor by once or twice, not only the polymer can not be obtained but also danger may occur. In fact, the inventor has overcome the misunderstandings of those skilled in the art, by adding all monomers compositions into the reactor by once, twice or three times, and with increasing heat dissipation of the reactor, the polymerization reaction temperature can be controlled under 55° C. or 65° C., to give the PVC processing plasticization modifying agent whose intrinsic viscosity is higher than 7.5. When the reaction temperature is less than 65° C., the reaction speed may be relatively difficult to control, but it is still possible polymerize to give a modifying agent of high viscosity coefficient polymer.

The testing method of the intrinsic viscosity for the invention is as follows: Put the processing modifying agent into the constant-temperature oven of 65° C. and keep 10 hours, and after cooling, weight 0.075 g samples with the balance of $10^4$ precision and put the sample into a flask of 25 ml volume, after that pour 20 ml chloroform into the flask to dissolve the samples, then keep the solution 24 hours until the samples are all dissolved, next put the flask into a constant-temperature water bath of 25±0.1° C. and keep 15 minutes, then dilute with chloroform to 25 ml calibration and filter with the #3 funnel, finally test the viscosity with the capillary viscosity meter, at the same time also test the viscosity of chloroform.

The intrinsic viscosity is calculated as follows:

$$\eta_r = t/t_0 \quad \eta_{sp} = \eta_r - 1 \quad \eta = 1/c\sqrt{2(\eta_{sp} - \ln\eta_r)}$$

Wherein, t—the time that solution of PVC modifying agent flows across the capillary pipe;

$t_0$—the time that chloroform flows across the same capillary pipe;

c—the concentration of the solution (g/100 ml);

$\eta_r$—the relative viscosity;

$\eta_{sp}$—the extra addition viscosity;

η—the intrinsic viscosity 100 ml/g.

The main achievements of the invention are as follows:

The inventor broke through the localization and misapprehension in the art and adopted high molecular-weight acrylate polymer with an intrinsic viscosity higher than 7.5 as modifying agent to enhance the plasticization properties of PVC, at same time the inventor also provided the preparation method of the modifying agent. In fact, by the above preparation method, the inventor successfully developed the acrylate modification polymer with high instrintic viscosity coefficient at the lower reaction temperature. Thus the inventor also broke through the misunderstanding of those skilled in the art regarding the polymerization reaction. The inventor is the first to bring forward the scientific theory which is the objective relationship between the intrinsic viscosity coefficient of the modifying agent and modification effect. The modifying agent can effectively improve the finish degree of PVC rheological block and obviously improve the PVC plasticization performance. The modifying agent can be widely used to enhance the processing plasticization property of PVC or other composite material containing polyvinyl chloride.

EXAMPLES FOR THE INVENTION

The invention is further explained by specific examples and comparative experiment examples. For getting comparative testing results, the Example 1 and Comparative examples 1 and 2 are conducted with the same formulation, the same reaction time and temperature. But the invention isn't limited to the following several examples.

Example 1

Added 120 parts by weight of water, 85 parts by weight of methyl methacrylate, 15 parts by weight of butyl methacrylate, 1.1 parts by weight of sodium dodecyl sulfate, 0.01 parts by weight of potassium persulfate together into the reactor by one time. Heated the reactor up to 50° C. at a stir rate of 200 round/min. Then kept 20 hours at less than 55° C., to give acrylate copolymer emulsion, followed by drying to give an acrylate copolymer with an intrinsic viscosity of 12.

Example 2

Added 120 parts by weight of water, 85 parts by weight of methyl methacrylate, 15 parts by weight of butyl methacrylate, 1.1 parts by weight of sodium dodecyl sulfate, 0.01 parts by weight of potassium persulfate together into the reactor by two times. Heated the reactor up to 50° C. at a stir rate of 200 round/min. Then kept 22 hours at less than 55° C., to give acrylate copolymer emulsion, followed by drying to give an acrylate copolymer with an intrinsic viscosity of 9.7.

Example 3

Same as Example 2 except the reaction mixture was added into the reactor by three times. Then obtained the acrylate copolymer with an intrinsic viscosity of 8.0.

Comparative Example 2

Same as Example 1 except the mixture consisting of 85 parts by weight of methyl methacrylate and 15 parts by weight of butyl acrylate was added into the reactor by four times, the adding sequences was that the second batch was added into the reactor after the first batch was reacted, and so on, finally, to give the acrylate copolymer with an intrinsic viscosity of 7.3.

Evaluation of the processing property of the modified PVC:

The highest torque and the balance torque were tested by RM-200 Torque Rheometer (manufactured by the Harbin University of Science and Technology Ha Si Te Ltd.) for PVC modified by the acrylate processing modifying agents with different intrinsic viscosity, in order to compare the differences of plasticization processing performance, the result being that the processing performances of PVC with the highest torque and the highest balance torque was the best. The detailed test conditions were as follows:
1. the rotation speed of rotator—35 rpm
2. the setting temperature—165° C.
3. the formulations for evaluations—100 parts by weight of PVC, 5 parts by weight of calcium carbonate, 3 parts by weight of dibasic lead phosphite, 0.15 parts by weight of chlorinated polyethylene wax, 0.2 parts by weight of stearic acid, 9 parts by weight of chlorinated polyethylene, and 0.7 parts by weight of calcium stearate, 1.5 parts by weight of lead stearate, 2 parts by weight of processing plasticization modifying agent (provided by Examples 1, 2 and 3 and Comparative examples 1 and 2).

The detailed testing results of the above-formulated PVC modified by the PVC processing modifying agent with different intrinsic viscosity coefficients are shown in Table 1.

TABLE 1

Comparison of the effect of plasticization processing modifying agent on the finish degree of PVC rheological block

| | Intrinsic viscosity | Highest torque (Nm) | Balance torque (Nm) | Finish degree of PVC rheological block |
|---|---|---|---|---|
| Example 1 | 12 | 37.2 | 36.0 | 00000 |
| Example 2 | 9.7 | 36.5 | 34.8 | 0000 |
| Example 3 | 8.0 | 36.0 | 34.4 | 0000 |
| Comparative example 1 | 7.3 | 35.5 | 33.9 | 000 |
| Comparative Example 2 | 6.0 | 32.0 | 30.0 | 0 |

The relation of PVC rheological block shown in Table 1 is as follows:

| 00000 | 0000 | 000 | 00 | 0 |
|---|---|---|---|---|
| Good | | | | bad |
| | | Finish degree | | |

It can be seen from Table 1 that, under the same formulation, the less feeding times, thereby the higher the intrinsic viscosity of the modifying agent, the higher the balance torque and highest torque of the modified PVC, the better the finish degree of the PVC rheological block, therefore, proving that the better the plasticization effect of the modified PVC. If the capping agent is added during reaction, the intrinsic viscosity value of the plasticization modifying agent will also be affected. However, the modification effect of the plasticization modifying agent is only related to its intrinsic viscosity value, and bears no relation to other factors which affect the molecular weight of the polymer.

Example 4

Added the 150 parts by weight of water, 70 parts by weight of methyl methacrylate, 25 parts by weight of ethyl methacrylate, 5 parts by weight of propyl acrylate, 0.1 parts by weight of sodium dodecyl benzene sulfonate, 0.1 parts by weight of potassium persulfate together into the reactor by one time. Heated the reactor up to 50° C. at a stir rate of 500 round/min. Then kept 15 hours at less than 55° C., to give the copolymer emulsion, followed by drying to give the copolymer with an intrinsic viscosity of 11.5.

Example 5

Added the 200 parts by weight of water, 70 parts by weight of methyl methacrylate, 25 parts by weight of butyl methacrylate, 5 parts by weight of amyl acrylate, 1.5 parts by weight of potassium dodecyl sulfate, 0.1 parts by weight of ammonium persulfate together into the reactor by one time. Heated the reactor up to 50° C. at a stir rate of 50 round/min. Then kept 15 hours at less than 55° C., to give the copolymer emulsion, followed by drying to give an acrylate copolymer with an intrinsic viscosity of 10.6.

Example 6

Added the 180 parts by weight of water, 70 parts by weight of methyl methacrylate, 25 parts by weight of butyl methacrylate, 5 parts by weight of octyl acrylate, 1.0 parts by weight of sodium dodecyl sulfonate, 0.01 parts by weight of potassium persulfate together into the reactor by two times. Heated the reactor up to 50° C. at a stir rate of 300 round/min. Then kept 25 hours at less than 55° C., to give the copolymer emulsion, followed by drying to give the copolymer with an intrinsic viscosity of 9.5.

PVC is modified by the different plasticization modifying agents which obtained from Examples 4, 5 and 6. The experimental formulations and the method of the plasticization evaluation and measurement are same as Examples 1 and 2. The result shows that the higher intrinsic viscosity coefficient of the plasticization modifying agent applied, the better modification ability to the PVC. The plasticization modifying agent from Example 4 has the best application effect. The modification ability of the plasticization modifying agent which comes from Example 6 is worse than that of Example 5. But the modification ability of plasticization modifying agents from the Examples 4, 5 and 6 are all obviously higher than that of current general modifying agents which have the same ingredients.

Example 7

Added the 120 parts by weight of water, 60 parts by weight of methyl methacrylate, 20 parts by weight of octyl methacrylate, 20 parts by weight of octyl acrylate, 1.2 parts by weight of sodium stearate, 0.05 parts by weight of potassium persulfate together into the reactor by one time. Heated the reactor up to 50° C. at a stir rate of 100 round/min. Then kept 22 hours at less than 55° C., to give the copolymer emulsion, followed by drying to give an acrylate copolymer with an intrinsic viscosity of 12.0.

Example 8

Same as Example 7 except the reaction mixture was added into the reactor by three times. Then obtained the acrylate copolymer with an intrinsic viscosity of 7.7.

Comparative Example 3

Same as Example 7 except the reaction mixture was added into the reactor by five times. Then obtained the acrylate copolymer with an intrinsic viscosity of 7.7.

PVC is modified by the different plasticization modifying agents which obtained from Examples 7, 8 and Comparative example 3. The experimental formulations and the method of the plasticization evaluation and measurement are same as Examples 1 and 2. The result shows that the higher the intrinsic viscosity coefficient of plasticization modifying agent, the better the plasticization modification effect of modifying agent. In addition, the modification ability of plasticization modifying agents from the Examples 7 and 8 are obviously higher than that of the Comparative example 3.

Example 9

Added the 100 parts by weight of water, 60 parts by weight of heptyl methacrylate, 40 parts by weight of methyl methacrylate, 1.5 parts by weight of sodium dodecyl benzene sulfonate, 0.005 parts by weight of potassium persulfate together into the reactor by one time. Heated the reactor up to 50° C. at a stir rate of 400 round/min. Then kept 20 hours at less than 55° C., to give the copolymer emulsion, followed by drying to give the acrylate copolymer with an intrinsic viscosity of 12.5.

Example 10

Same as Example 9 except the reaction mixture was added into the reactor by three times. Then obtained the acrylate copolymer with an intrinsic viscosity of 9.3.

Comparative Example 4

Same as Example 10 except the reaction temperature was controlled in the range of 70-80° C. Then obtained the acrylate copolymer with an intrinsic viscosity of 5.5.

PVC is modified by the different plasticization modifying agents which obtained from Examples 9, 10 and Comparative example 4. The experimental formulations and the method of the plasticization evaluation and measurement are same as Examples 1 and 2. The result shows that the higher intrinsic viscosity coefficient of acrylate copolymers, the better the processing modification effect of modifying agent. In addition, the modification ability of processing modifying agents from the Example 9 is obviously higher than that of the experiment example 10, and the modification ability of processing modifying agents from the Examples 9 and 10 is obviously higher than that of the Comparative example 4.

Example 11

Added the 250 parts by weight of water, 20 parts by weight of hexyl acrylate, 50 parts by weight of methyl methacrylate, 30 parts by weight of amyl methacrylate, 1.5 parts by weight of sodium stearate, 0.2 parts by weight of ammonium persulfate together into the reactor by one time. Heated the reactor up to 50° C. at a stir rate of 50 round/min. Then kept 18 hours at less than 55° C., to give the copolymer emulsion, followed by drying to give the acrylate copolymer with an intrinsic viscosity of 10.5.

Example 12

Added the 180 parts by weight of water, 80 parts by weight of hexyl methacrylate, 20 parts by weight of methyl acrylate, 0.5 parts by weight of sodium dodecyl sulfate, 0.08 parts by weight of potassium persulfate together into the reactor by one time. Heated the reactor up to 50° C. at a stir rate of 240 round/min. Then kept 10 hours at less than 50° C., to give the copolymer emulsion, followed by drying to give the acrylate copolymer with an intrinsic viscosity of 13.0.

Example 13

Added the 200 parts by weight of water, 40 parts by weight of methyl methacrylate, 40 parts by weight of propyl methacrylate, 20 parts by weight of heptyl acrylate, 0.3 parts by weight of potassium dodecyl sulfate, 0.01 parts by weight of potassium persulfate together into the reactor by three times. Heated the reactor up to 50° C. at a stir rate of 120 round/min. Then kept 15 hours at less than 55° C., to give the copolymer emulsion, followed by drying to give the acrylate copolymer with an intrinsic viscosity of 11.2.

Example 14

Added the 180 parts by weight of water, 50 parts by weight of methyl methacrylate, 40 parts by weight of ethyl methacrylate, 10 parts by weight of heptyl acrylate, 1.2 parts by weight of sodium stearate, 0.05 parts by weight of potassium persulfate together into the reactor by one time. Heated the reactor up to 50° C. at a stir rate of 100 round/min. Then kept 16 hours at less than 55° C., to give the copolymer emulsion, followed by drying to give the acrylate copolymer with an intrinsic viscosity of 11.8.

Example 15

Added the 200 parts by weight of water, 80 parts by weight of methyl methacrylate, 20 parts by weight of butyl acrylate, 0.5 parts by weight of sodium dodecyl sulfate, 0.02 parts by weight of potassium persulfate together into the reactor by two times. Heated the reactor up to 60° C. at a stir rate of 200 round/min. Then kept 15 hours at less than 65° C., to give the copolymer emulsion, followed by drying to give the acrylate copolymer with an intrinsic viscosity of 9.5.

Example 16

Added the 100 parts by weight of water, 20 parts by weight of methyl methacrylate, 20 parts by weight of propyl methacrylate, 20 parts by weight of amyl methacrylate, 10 parts by weight of ethyl acrylate, 20 parts by weight of amyl acrylate, 10 parts by weight of propyl acrylate, 1.3 parts by weight of sodium dodecyl sulfate, 0.15 parts by weight of potassium persulfate together into the reactor by one time. Heated the reactor up to 50° C. at a stir rate of 80 round/min. Then kept 10 hours at less than 65° C., to give the copolymer emulsion, followed by drying to give the acrylate copolymer with an intrinsic viscosity of 10.1.

Example 17

Added the 150 parts by weight of water, 60 parts by weight of methyl methacrylate, 20 parts by weight of hexyl methacrylate, 20 parts by weight of octyl methacrylate, 0.5 parts by weight of sodium dodecyl benzene sulfonate, 0.2 parts by weight of potassium persulfate together into the reactor by three times. Heated the reactor up to 50° C. at a stir rate of 100 round/min. Then kept 25 hours at less than 65° C., to give the copolymer emulsion, followed by drying to give the acrylate copolymer with an intrinsic viscosity of 7.6.

Example 18

Added the 200 parts by weight of water, 70 parts by weight of butyl methacrylate, 10 parts by weight of butyl acrylate, 10 parts by weight of hexyl acrylate, 10 parts by weight of octyl acrylate, 0.1 parts by weight of potassium dodecyl sulfate, 0.01 parts by weight of ammonium persulfate together into the reactor by one time. Heated the reactor up to 60° C. at a stir rate of 200 round/min. Then kept 16 hours at less than 65° C., to give the copolymer emulsion, followed by drying to give the acrylate copolymer with an intrinsic viscosity of 9.8.

Example 19

Added the 160 parts by weight of water, 80 parts by weight of amyl methacrylate, 20 parts by weight of amyl acrylate, 0.8 parts by weight of sodium dodecyl sulfate, 0.002 parts by weight of potassium persulfate together into the reactor by two times. Heated the reactor up to 50° C. at a stir rate of 400 round/min. Then kept 12 hours at less than 65° C., to give the copolymer emulsion, followed by drying to give the acrylate copolymer with an intrinsic viscosity of 8.3.

Example 20

Added the 180 parts by weight of water, 20 parts by weight of butyl methacrylate, 20 parts by weight of hexyl methacrylate, 20 parts by weight of amyl methacrylate, 20 parts by weight of propyl methacrylate, 20 parts by weight of hexyl acrylate, 1.5 parts by weight of sodium dodecyl sulfate, 0.05 parts by weight of potassium persulfate together into the reactor by one time. Heated the reactor up to 50° C. at a stir rate of 300 round/min. Then kept 10 hours at less than 65° C., to give the acrylate copolymer emulsion, followed by drying to give the acrylate copolymer with an intrinsic viscosity of 10.5.

Example 21

Added the 220 parts by weight of water, 40 parts by weight of butyl methacrylate, 25 parts by weight of hexyl methacrylate, 15 parts by weight of propyl acrylate, 20 parts by weight of octyl acrylate, 1.0 parts by weight of sodium dodecyl sulfate, 0.1 parts by weight of potassium persulfate together into the reactor by three times. Heated the reactor up to 55° C. at a stir rate of 50 round/min. Then kept 20 hours at less than 65° C., to give the acrylate copolymer emulsion, followed by drying to give the acrylate copolymer with an intrinsic viscosity of 7.8.

The invention claimed is:

1. A plasticization modifying agent for polyvinyl chloride processing in the form of a high molecular weight polymer of an intrinsic viscosity of 7.8 to 13 dl/g, obtained from a monomer composition consisting of 60 to 95 parts by weight of $C_{1-8}$ alkyl methacrylate and 5 to 40 parts by weight of $C_{2-8}$ alkyl acrylate with a total of 100 parts, wherein the high molecular weight polymer is obtained by the following steps: adding 100 to 250 parts by weight of water into a reactor, and then adding the monomer composition consisting of 60 to 95 parts by weight of the $C_{1-8}$ alkyl methacrylate and 5 to 40 parts of weight of the $C_{2-8}$ alkyl acrylate with a total of 100 weight parts, 0.1 to 1.5 parts by weight of a surfactant and 0.001 to 0.2 parts by weight of a free-radical initiator into the same reactor one, two, or three times, wherein stirring resulting mixture solution at 50-500 round/min and heating the solution to 40-60° C. and maintaining temperature of the solution under 65° C., wherein after reacting 10-25 hours, obtaining a polymer emulsion, and drying the polymer emulsion to give the plasticization modifying agent for polyvinyl chloride processing, wherein the radical initiator is selected from the group consisting of potassium persulfate and ammonium persulfate, and wherein the intrinsic viscosity is measured in chloroform by an ubbelohde viscometer.

2. A plasticization modifying agent for polyvinyl chloride processing according to claim 1, wherein the high molecular-weight polymer is obtained by the following steps:
adding 100 to 250 parts by weight of water into a reactor, and then adding the monomer composition consisting of 60 to 95 parts by weight of the $C_{1-8}$ alkyl methacrylate and 5 to 40 parts by weight of the $C_{2-8}$ alkyl acrylate with total weight of 100 parts, 0.1 to 1.5 parts by weight of the a surfactant and 0.001 to 0.2 parts by weight of the free-radical initiator into the same reactor one, two, or three times, wherein stirring the resulting mixture solution at 50-500 round/min and heating the solution to 40-50° C., and maintaining the temperature of the solution under 55° C., wherein after reacting 10-25 hours, obtaining a polymer emulsion and drying the polymer emulsion to give the plasticization modifying agent for polyvinyl chloride processing.

3. A plasticization modifying agent for polyvinyl chloride processing according to claim 1, wherein the $C_{1-8}$ alkyl methacrylate is one or a mixture of two or more kinds of $C_{1-8}$ alkyl methacrylate, and wherein the $C_{2-8}$ alkyl acrylate is one or a mixture of two or more kinds of $C_{2-8}$ alkyl acrylate.

4. A plasticization modifying agent for polyvinyl chloride processing according to claim 1, wherein the surfactant is selected from the group consisting of sodium dodecyl benzene sulfonate, sodium dodecyl sulfonate, sodium dodecyl sulfate, sodium stearate and potassium dodecyl sulfate.

5. A method for plasticizing polyvinyl chloride, wherein the plasticization modifying agent according to claim 1 is added to polyvinyl chloride at 0.1%-10% by weight of polyvinyl chloride.

6. A preparation method of plasticization modifying agent for polyvinyl chloride processing, comprising the following steps: adding 100 to 250 parts by weight of water into a reactor and then adding a monomer composition consisting of 60 to 95 parts by weight of $C_{1-8}$ alkyl methacrylate and 5 to 40 parts by weight of $C_{2-8}$ alkyl acrylate with total weight of 100 parts, 0.1 to 1.5 parts by weight of a surfactant and 0.001 to 0.2 parts by weight of a free-radical initiator into the same reactor by one, two, or three times, stirring resulting mixture solution at 50-500 round/min and heating the solution to 40-60° C., and maintaining temperature of the solution under 65° C., wherein after reacting 10-25 hours, obtaining a polymer emulsion and drying to give the plasticization modifying agent for PVC processing, wherein the radical initiator is selected from the group consisting of potassium persulfate and ammonium persulfate, wherein the plasticization modifying agent is a high molecular weight polymer with an intrinsic viscosity of 7.8 to 13 dl/g, and wherein the intrinsic viscosity is measured in chloroform by an ubbelohde viscometer.

7. A preparation method of plasticization modifying agent for polyvinyl chloride processing according to claim 6, wherein the solution is heated to 40-50° C., and the temperature of the solution is maintained under 55° C.

8. A preparation method of plasticization modifying agent for polyvinyl chloride processing according to claim 6, wherein the $C_{1-8}$ alkyl methacrylate is one or a mixture of two or more kinds of $C_{1-8}$ alkyl methacrylate, and wherein the $C_{2-8}$ alkyl acrylate is one or a mixture of two or more kinds of $C_{2-8}$ alkyl acrylate.

9. A preparation method of plasticization modifying agent for polyvinyl chloride processing according to claim 6, wherein the surfactant is selected from the group consisting of sodium dodecyl benzene sulfonate, sodium dodecyl sulfonate, sodium dodecyl sulfate, sodium stearate and potassium dodecyl sulfate.

* * * * *